Nov. 26, 1968

M. P. CHAPLIN 3,412,862

METHOD AND APPARATUS FOR CLEANING AREAS
OVERLAIN BY A WATER BODY

Filed Sept. 7, 1967

INVENTOR.
Merle P. Chaplin

BY
George H. Baldwin
ATTORNEY

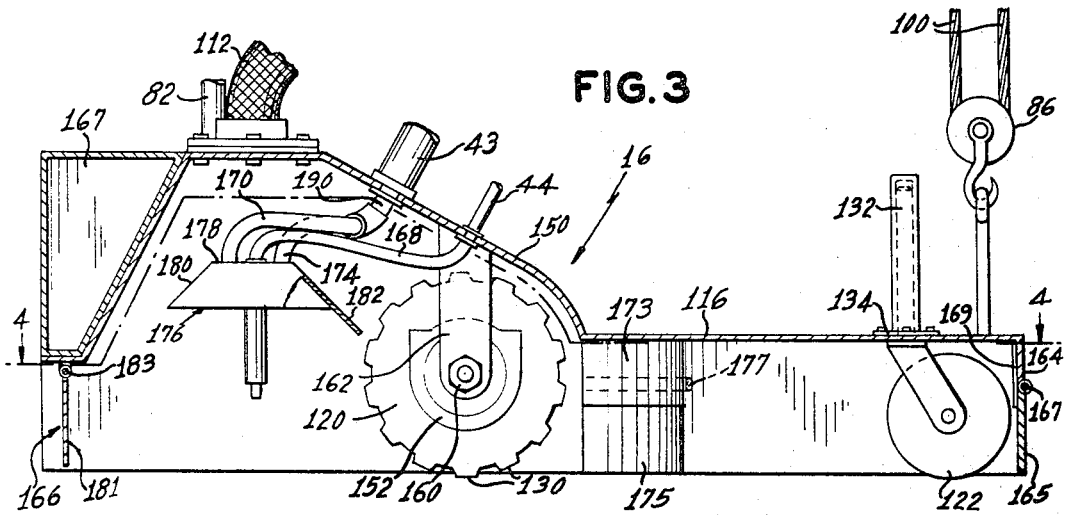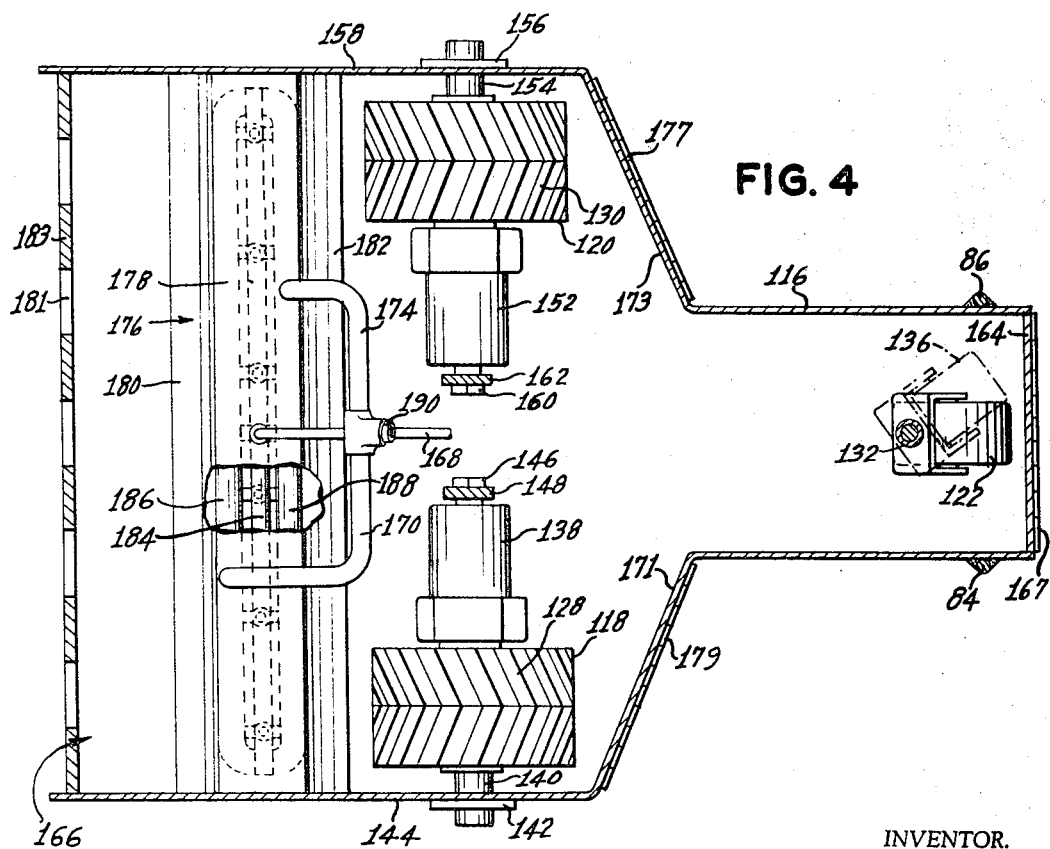

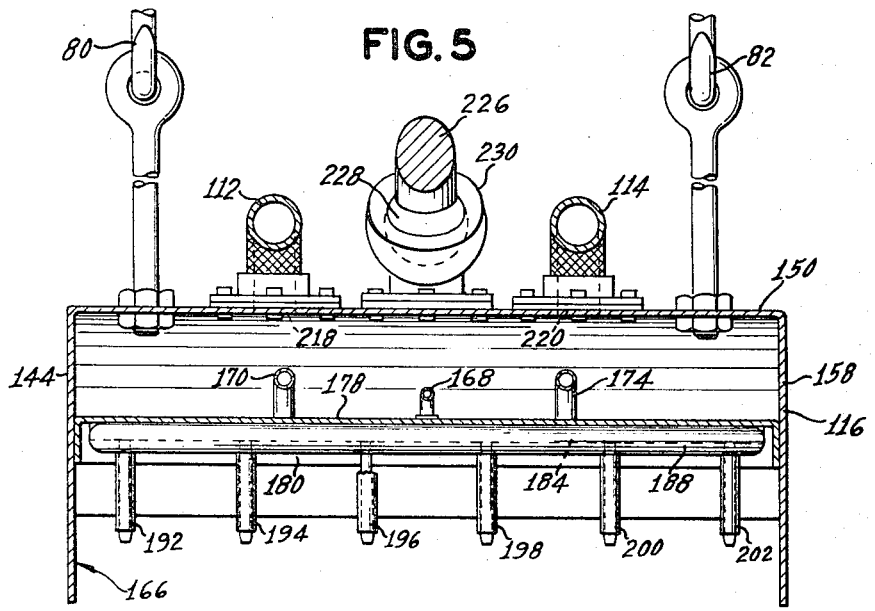
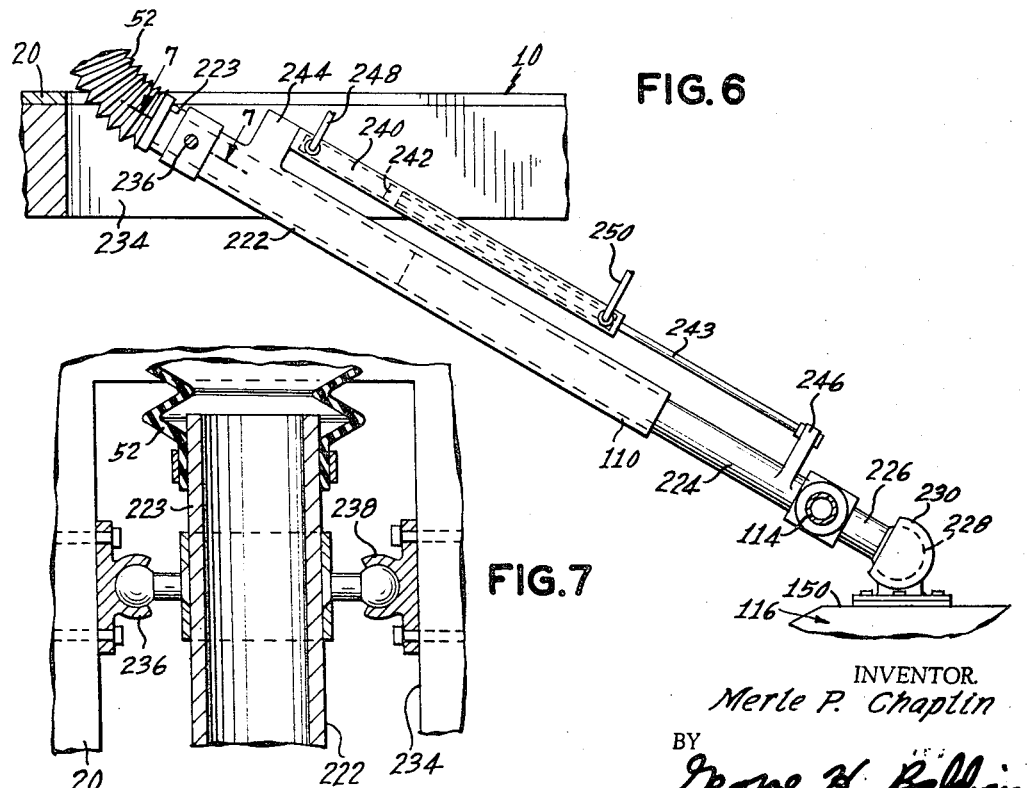
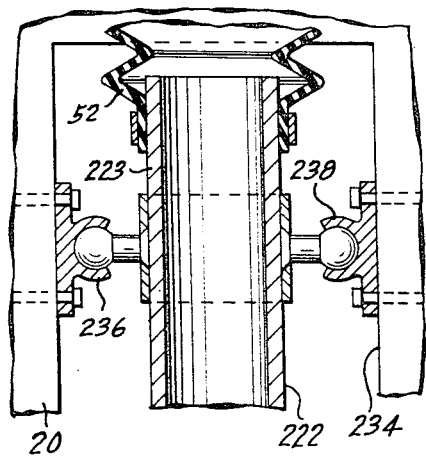

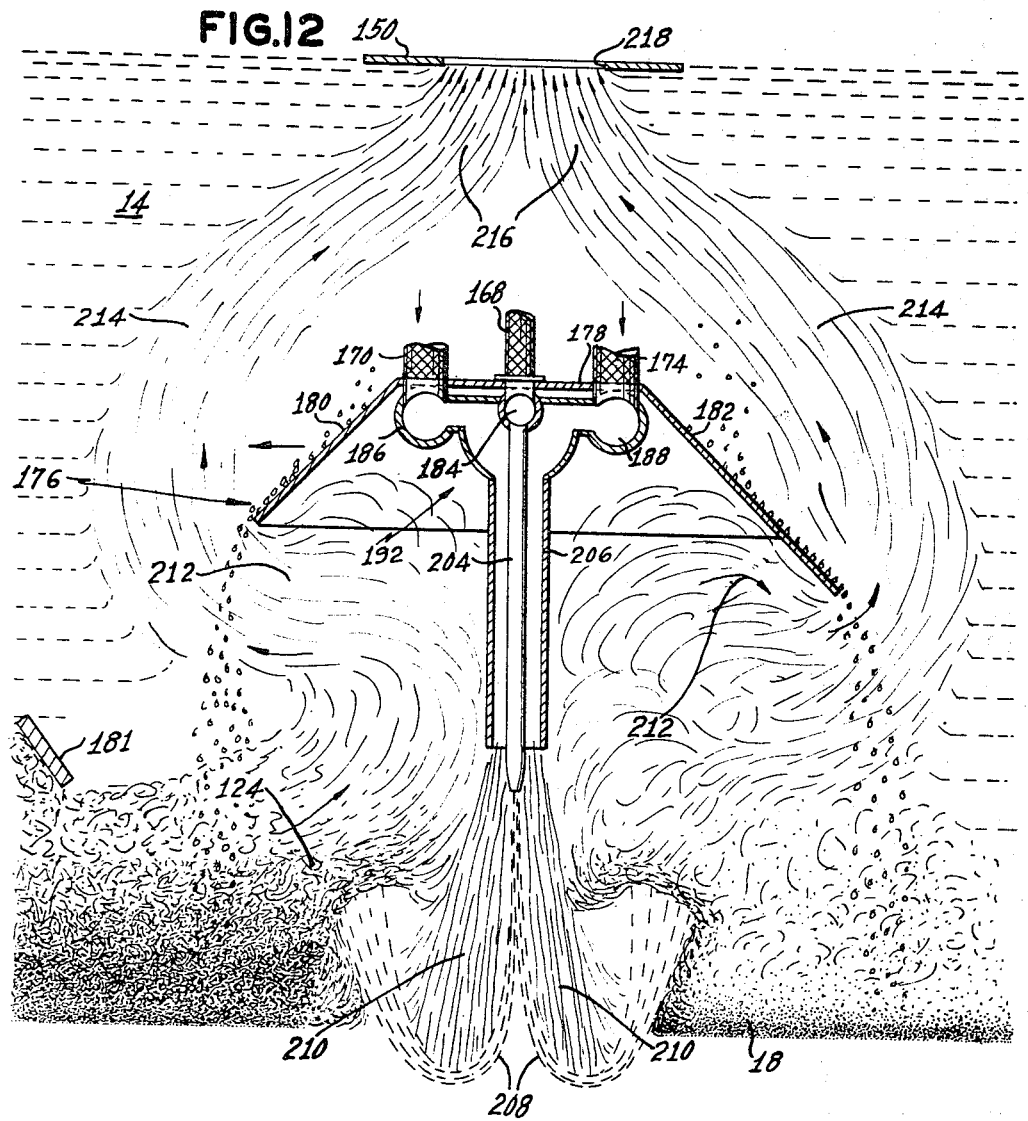

Nov. 26, 1968  M. P. CHAPLIN  3,412,862
METHOD AND APPARATUS FOR CLEANING AREAS
OVERLAIN BY A WATER BODY
Filed Sept. 7, 1967  5 Sheets-Sheet 5

INVENTOR.
Merle P. Chaplin
BY
George H. Baldwin
ATTORNEY

United States Patent Office 3,412,862
Patented Nov. 26, 1968

3,412,862
METHOD AND APPARATUS FOR CLEANING
AREAS OVERLAIN BY A WATER BODY
Merle P. Chaplin, 609 Driver Ave.,
Winter Park, Fla. 32789
Filed Sept. 7, 1967, Ser. No. 666,090
15 Claims. (Cl. 210—73)

ABSTRACT OF THE DISCLOSURE

A method and apparatus for cleaning a water covered sand bottom basin which has been polluted and contaminated by deposited materials lying on the bottom of the basin which includes the steps of moving a generally enclosed housing, containing a plurality of spaced fluid jets directed generally downwardly and a baffle positioned above the jets, over the polluted and contaminated sand bottom of the basin by the use of a pair of powered wheels positioned within the housing; producing a suction on the bottom of the contaminated and polluted basin within the housing to laden the deposited materials and sand within water moving into the housing and upward from the bottom of the basin; penetrating the contaminated and polluted bottom of the basin by the use of the pressurized fluid jets such that additional deposited materials and sand become laden within the water and fluid mixture moving upwardly from the bottom of the basin; changing the direction of flow and decreasing the rate of flow of the upwardly moving laden mixture by use of the baffle to permit the sand to become generally separated by settling on the bottom of the basin from the remainder of the laden mixture; removing the remainder of the laden mixture from the housing to the surface of the water by suction pumping; centrifugally separating the water and fluid from the remainder of the laden mixture; discharging the separated water and fluid back into the basin; and pumping the remainder of the laden mixture to a disposal area outwardly of the basin.

BACKGROUND AND SUMMARY OF THE INVENTION

This invention relates to a method and apparatus for decontaminating surfaces overlain by a body of water. More particularly, this invention is concerned with apparatus and a method for cleaning the soft bottoms of lakes, particularly land-locked lakes and lakes in which there is little or no outflow or drainage, which have been contaminated by silt, sludge and the like which has been washed thereinto from the adjacent land surface areas. Additional contamination of these lakes often results from inefficient sewage and industrial waste disposal systems.

At one time most of the land-locked lakes or lakes having little or no outflow or drainage were surrounded by marshy or low-lying areas through which rainfall and surface water were absorbed, filtered and cleaned and finally reached the lakes by springs. With the increase of urbanization, large parking areas, shopping centers, super highways and the like were built, causing the drainage into these types of lakes to come largely over the surface of land through pipes which collected the water from various areas; all of this type of drainage carrying with it surface materials such as top soil, fertilizer, plant, grass and other seeds, and other like materials which were deposited on the lake bottoms and eventually accumulated to a degree where they become decidedly objectionable. These lake bottom deposits promoted the growth of algae and other undesirable and contaminating materials and adversely affected the fish life and the general usefulness of the lakes for recreation and other purposes. Frequently the materials which have found their way to these types of lakes and other bodies of water by drainage carries with it seeds which promote grass, weed and other growth which obstruct the normal lake waterways and canals, and as such are detrimental to boating, swimming and the like.

Often times large cultivated areas such as citrus groves, gardens, lawns, grasslands and the like which are adjacent to land-locked lakes or other bodies of water having little or no outflow or drainage frequently have overflow conditions whereby materials from these cultivated areas flow into the lakes carrying with it fertilizer, top soil and other materials valuable to the cultivated area itself, but entirely lost and undesirable on the lake bottom. It would be highly desirable if such valuable materials could be removed from lake bottoms and returned to the cultivated areas where they would be highly valuable, useful and beneficial as mulch, fertilizer, filling and for other like purposes. In this manner the removal of the contaminating materials from the lake bottom and transfer to the adjacent cultivated areas would not only materially and substantially improve the lake condition for fish, recreation and other purposes but would likewise be of considerable value to the surrounding land surface areas from which it had been previously removed by surface water flowage and drainage into the lake. The drainage of rain and surface waters into the lakes through storm sewers and over adjacent land surface areas is something which is difficult, if not impossible, to correct and eliminated, and will be a continuing source of trouble and lake contamination.

Therefore it is a general object of this invention to provide a method and apparatus to remove the various materials and contaminants which have accumulated on lake bottoms and return the same to the adjacent land surface areas where they are valuable, useful and beneficial, all without permitting the removed materials to escape from the apparatus to the surrounding lake waters to further contaminate the same.

Another general object of the subject invention is to provide a method and apparatus for decontaminating areas which are overlain by a body of water, and particularly the bottoms of land-locked lakes and lakes where there is little or no outflow or drainage.

A further general object of the invention is to provide a method and apparatus for returning to the adjacent land surface areas surrounding land-locked lakes or lakes having little or no outflow or drainage the silt, sludge and other like materials which have accumulated on such lake bottoms due to the surface drainage and runoff into the lakes.

A more specific object of this invention is to provide apparatus for separating the deposited and accumulated materials found on the bottom of land-locked lakes or lakes having little or no outflow or drainage from the original sand of the bottoms of such lakes.

A further specific object of the invention is to provide apparatus for bringing contaminating materials to the surface of a lake.

Still another specific object of the subject invention is to provide apparatus for removing a substantial part of the water from the lake bottom deposited materials which have been removed from the lake bottom and transferring the remaining materials to the adjacent land surface areas where its filling and fertilizing values can be utilized.

Still a further specific object of this invention is to provide apparatus for accomplishing the above and other objects without materially contaminating adjacent lake waters by the deposited materials which are removed.

These objects are in general accomplished by providing a method and apparatus for cleaning a water covered sand bottom basin which has been contaminated and polluted by deposited materials lying on the bottom of the basin which includes the steps of moving a generally enclosed housing, containing a baffle, over the polluted and contaminated basin by the use of a pair of powered wheels positioned within the housing; producing a suction on the bottom of the contaminated and polluted basin within the housing to laden the deposited materials and sand within water moving into the housing and upward from the bottom of the basin; changing the direction of flow and decreasing the rate of flow of the upwardly moving laden mixture by use of the baffle to permit the sand to become generally separated by settling on the bottom of the basin from the remainder of the laden mixture; removing the remainder of the laden mixture from the housing to the surface of the water by suction pumping; centrifugally separating the water from the remainder of the laden mixture; discharging the separated water back into the basin; and pumping the remainder of the laden mixture to a disposal area outwardly of the basin.

Description of the drawings

The novel features which are believed to be characteristic of this invention are set forth with particularity in the appended claims. The invention itself, however, both as to its organization and method of operation, may best be understood by reference to the following description taken in connection with the accompanying drawings, in which:

FIG. 3 is an enlarged transverse sectional view taken along line 3—3 of FIG. 1;

FIG. 4 is a cross-sectional view taken along line 4—4 of FIG. 3;

FIG. 5 is an enlarged transverse sectiontl veiw ttken along line 5—5 of FIG. 2;

FIG. 6 is an enlarged transverse sectional view taken along line 6—6 of FIG. 1;

FIG. 7 is an enlarged cross-sectional view taken along line 7—7 of FIG. 6;

FIG. 8 is a right hand end view of FIG. 2 looking in the direction of arrow 8;

FIG. 12 is an enlarged detailed view illustrating the action of the baffle and one of the jets used in the apparatus of this invention.

Detailed description

Figure 1:
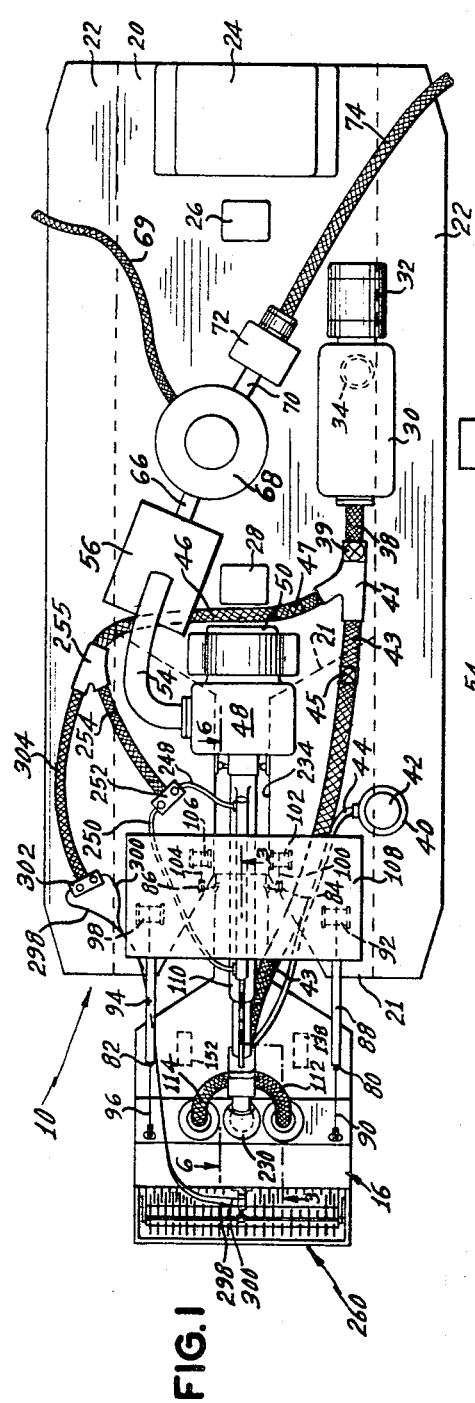
FIG. 1 is a top plan view of the apparatus of this invention.
Figure 2:
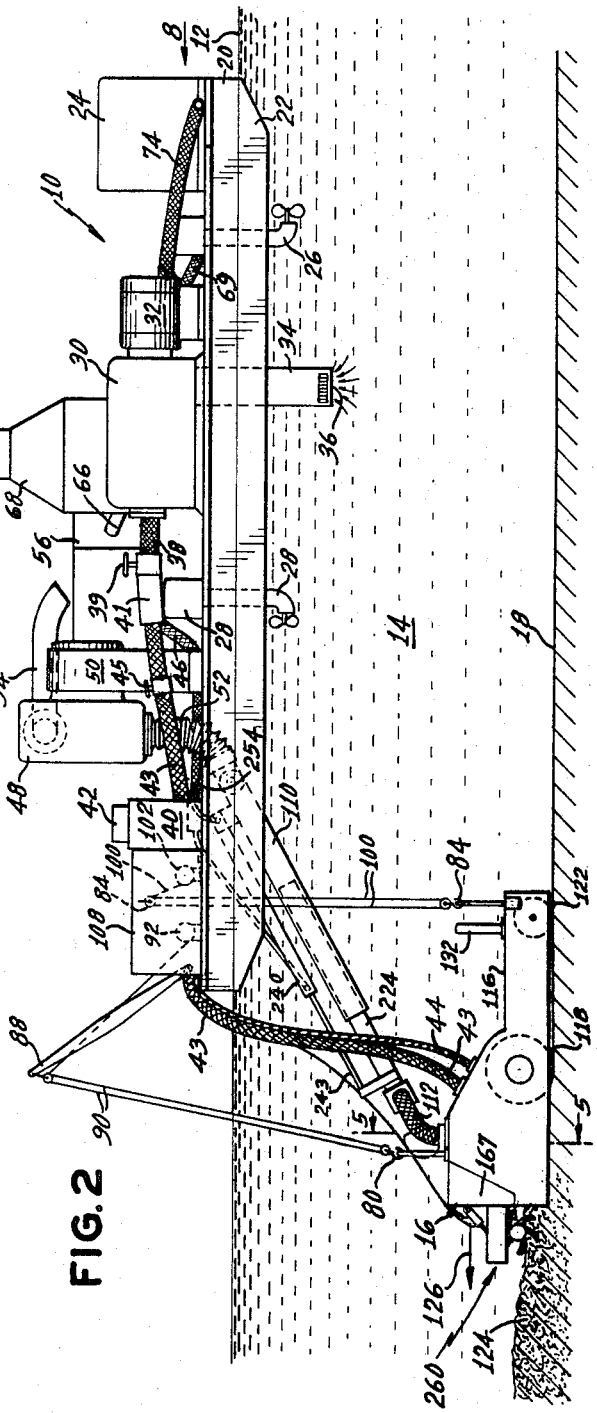
FIG. 2 is a side elevational view of the apparatus of this invention.

Referring to the drawings in detail now, and in particular to FIGS. 1 and 2 thereof, the apparatus of this invention is seen to include a first portion 10 which floats upon the surface 12 of a body of water 14 and a second portion 16 which is connected to the first portion 10 and which traverses the lake bottom 18 or area overlain by a body of water. The first or floating portion 10 of the apparatus includes a barge or floating structure 20 of any suitable size having a pontoon 22 along each of its elongated sides, additional pontoons, as at 21 may be provided under the front and/or rear ends of the barge, if so desired to aid in further supporting the weight of the necessary equipment carried on the barge.

An electric generator 24 mounted on the central rear portion of the barge 20 to supply electric current to various pieces of equipment such as pumps, motors and the like, employed in the process of this invention. A pair of rotatable electric propeller motors 26 and 28 move the barge 20 in forward and rearward directions over the body of water 14 to position the same over the desired area of lake bottom 18 to be cleaned. These motors 26 and 28 are also used to aid in the cleaning operation and to maintain the barge in position over the area to be cleaned. Although two motors 26 and 28 have been shown in the embodiment depicted other methods and means could be used to propel the barge 20 across the surface 12 of the water in accomplishing the cleaning of the lake bottom or to maintain barge 20 in position during the cleaning operation.

There is additionally mounted on barge 20 a main feed, pressure type pump 30 which is driven by a variable speed engine or motor 32 mounted closely adjacent thereto. The water intake 34 for pump 30 extends through the barge 20 and terminates in an open end 36 underneath the barge, well within the body of water 14. Intake 34 is provided with screening across its lower end 36 or other like protective means to prevent foreign objects from entering the pump 30. A discharge line or hose 38 is connected at one of its ends to the discharge side of pump 30 and has its other end attached to a Y-member 41. Included in discharge line 38 is a control valve 39 used to regulate the quantity and pressure of fluid flowing therein. Leading from one side of Y-member 41 is a flowline 43, having a control valve 45 therein, which extends downward to and connects with the cleaning or lower portion 16 of the apparatus to supply fluid to the nozzle arrangement therein, the operation of which will be explained hereinbelow. Connected to the other side of Y-member 41 is a flowline 46, having a control valve 47 therein, which connects to an additional Y-member 255 such as to supply pressurized fluid to operate various pieces of hydraulic equipment which may be employed with the apparatus of this invention, to be described hereinafter.

A main suction pump 48 is mounted to the barge 20 in its mid-portion and adjacent the forward end thereof; suction pump 48 being driven by a variable speed engine motor 50 which is mounted closely adjacent thereto. The suction side or intake of main suction pump 48 is connected to the upper end of flexible hose 52, the lower end of which communicates with the cleaning portion 16 on the lake bottom 18 which connection will be explained more fully hereinafter. The discharge side of pump 48 is connected to one end of a discharge hose 54 the other end of which terminates in an open tank 56. By using an open tank at this point in the processing equipment the operator thereof can observe the efficiency with which the submerged portion of the apparatus is operating and make adjustments to the equipment as may be needed, particularly as to suction pump 48. The open tank also provides for the additional separation of sand, wood, trash, and other like junk materials from the silt and fluid flow before the same is further processed. A centrifuge 68 is provided to separate the water from the sludge, silt and other materials taken from the lake bottom, which flow into centrifuge 68 from open tank 56 via pipe 66. Clean water is discharged from the centrifuge 68 through hose 69 and is returned directly to the lake or body of water 14. The sludge and silt are removed from centrifuge 68 and pumped through hose 70 by means of a pump 72. The outlet of pump 72 is connected to hose 74 through which the sludge is pumped to the disposal area or returned to the land surface areas for filling, fertilization and other like purposes, which are adjacent the lake and from which the same had been previously washed into the lake and deposited on the bottom thereof.

The type of centrifuge 68 preferably used is one where the ratio of thickened material to the clean water discharged to the lake can be varied within fairly wide limits. In certain cases where the silt is to be delivered to an area where substantial irrigation is desirable, the amount of water relative to silt can be increased. In cases where the silt is to be used for filling, top dressing and fertilizing purposes the water used to transport the silt can be reduced. There may be cases where it is desirable to move the silt to distant locations by truck or similar means, in which case just enough water is left in the mixture as it leaves the centrifuge to permit it to be pumped to a disposal area where the silt can be sufficiently dried out, after which it can be loaded onto trucks or other means for distant transportation.

Additionally, there is provided and mounted on barge 20 a small air-compressor 40 and a motor 42 cooperatively connected to the air-compressor 40 to drive the same. The discharge side of air-compressor 40 is connected to one end of a hose 44; the other end of which is connected to and communicates with the underwater portion 16 of the apparatus. This source of compressed air is used to aid in the cleaning of the lake bottom, in particular beach and other like areas, in a manner as will be disclosed more fully hereinafter.

The second or cleaning portion 16 of the apparatus of this invention moves over and across the lake bottom 18 and is connected to the barge 20 floating on the water's surface 12 by means of a series of four lifting mechanisms, two of which 80 and 82 are attached adjacent the front of the cleaning portion and two of which 84 and 86 are connected adjacent the rear of this second portion 16. Lifting mechanism 80 includes a crane structure 88 having attached thereto adjacent its outer end a rope fall or lift 90 which is operated by a suitable winch 92. In like manner lifting mechanism 82 comprises a crane structure 94 having a rope fall or lift 96 attached to its outer end and a winch 98 to operate the fall or lift. Lifting mechanism 84 connected to the rear of cleaning portion 16 includes a rope fall or lift 100 and a suitable winch 102 for operating the same; similarly lifting mechanism 86 comprises a rope fall or lift 104 which is operated by a winch 106. A suitable housing 108 is provided adjacent the front portion of the barge 20 to cover and enclose portions of the four lifting mechanisms 80, 82, 84 and 86. If desirable winches 92, 98, 102 and 106 may be provided with automatic tensioning devices such as to lift and support a part of the weight of the cleaning portion 16 thereby enabling it to move more readily over and across the lake bottom.

Additionally connecting the cleaning portion 16 to the floating portion 10 and communicating therebetween is a telescoping pipe 110. The length of telescoping pipe 110 is adjustable such that it can be changed to accommodate pipe 110 to various depths. Upper end of pipe 110 is connected to lower end of flexible hose 52 attached to the intake side of main suction pump 48, and its lower end communicates with two flexible hoses 112 and 114 which are attached to the top of the lake cleaning portion 16.

With particular reference to FIGS. 3 and 4 now, the lower or lake cleaning portion 16 includes a hood or housing structure 116 which is meant to traverse and move over the lake bottom 18 by means of two large traction wheels 118 and 120 and a third trailing, swivel-type wheel 122. All of the agitation and stirring-up of the sludge and silt 124 deposited on lake bottom 18 occurs and takes place beneath hood or housing 116 such as to prevent escape of the agitated lake bottom deposits and contamination of the surrounding water area by the same during the cleaning operation.

Lake bottom cleaning portion 16 is intended to move in the direction of arrow 126 over the lake bottom by powered wheels 118 and 120 which are provided with tread for traction at 128 and 130 respectively, the housing or hood 116 being maintained in proper position on the lake bottom and properly spaced therefrom by trailing wheel 122. By proper positioning of wheels 118, 120 and 122, housing 116 is maintained closely adjacent lake bottom 18 to avoid contamination of the water surrounding housing 116 by preventing the spreading or dispersion of the contaminating materials 124 which are being agitated with housing 116. Trailing wheel 122 is swivelable through a horizontal arc of 360 degrees within its encasement 132 which is mounted to housing 116 at 134; one swivel position being shown by dashed lines at 136 in FIG. 4. The direction of movement of the cleaning portion 16 over the lake bottom may be changed by varying the speed of rotation of one of the traction wheels 118, 120 relative to the other wheel.

Traction wheel 118 is powered by a sealed reversible electric motor 138 operatively connected thereto and mounted with wheel 118 on a rotatable shaft or axle 140. Motor 138 is supplied electric current from electric generator 24 on the barge by means of electrical conducting wires (not shown). One end of rotatable shaft 140 is journalized at 142 within side wall 144 of housing 116 and the other end thereof is journalized at 146 in a support member 148, which rises generally vertically therefrom to connect to the upwardly enlarged section or domed top portion 150 of housing 116. In similar fashion, traction wheel 120 is driven by a sealed reversible electric motor 152 which is mounted along with wheel 120 to a rotatable shaft or axle 154. Electric motor 152 is also powered by generator 24. One end of axle 154 is journalized at 156 within side wall 158 of housing 116 and the opposite end thereof is journalized at 160 in a support member 162, which rises generally vertically therefrom to connect with the domed top portion 150 of housing 16. Electric motors 138 and 152 are waterproof, variable speed, reversible and are controllable from barge 20.

The side walls 144 and 158 along with back wall portion 164 of housing 116 are maintained, by a proper positioning of wheels 118, 120 and 122, closely adjacent the lake bottom 18, such as to prevent the escape of agitated silt and sludge from hood 116, thereby avoiding contamination of the lake water surrounding the area where the cleaning process is being carried out. Back wall portion 164 of housing 116 includes a gate or swinging rear door 165 extending thereacross. Door 165 is hinged at 167 such that the same may open outwardly of housing 116 in such a manner as to permit the passage outwardly of housing 116 of any stones, large pieces of wood, or other like junk materials over which lower portion 16 may pass in traveling over the lake bottom 18. A stop 169 is provided to prevent door 165 from opening inwardly of housing 116 such that slit and sludge will be prevented from entering housing 116 from its back wall. In similar fashion and for like purposes swinging doors or gates are provided at 171 and 173 within respective side walls 144 annd 158. The swinging door 175 within wall portion 173 is hinged at 177 to open outwardly of housing 116, and the gate within wall portion 171 is hinged in the same manner at 179. These swinging doors at 171 and 173 are also provided with stop members to prevent them from opening inwardly of housing 116. When the doors are closed their lower edges are in closed proximity to the lake bottom thereby preventing escape of any contaminating material. The front end 166 of the housing is slightly raised or opened to permit the sludge and silt 124 deposited on the lake bottom to enter the cleaning portion 116 of the apparatus as the same is moved in the direction of arrow 126 over the lake bottom 18. Opening 166 is provided with a swinging door 181 which extends thereacross and which is hinged to housing 116 at 183. Front door 181, although standing in a generally vertical closed position as depicted in FIG. 3 when the lower portion 16 is not in operation, will normally be in a partially opened position as depicted in FIG. 12 due to the in-rushing silt and sludge coming through opening 166 when lower portion 116 is in operation moving over the lake bottom. If so desired, an air chamber or tank 167 attached to the top, front portion of housing 116 may be provided to reduce the weight of this end of the cleaning portion 16 thereby making the apparatus more readily maneuverable over the lake bottom.

Centrally positioned within the domed top portion 150 of housing 116 is an inverted U-shaped baffle 176 which extends between and is connected to side walls 144 and 158 of housing 116. Baffle 176 has a generally flat and horizontal top member 178 and two depending, inclined side members 180 and 182; side member 182 being longer than side member 180 and therefore depending somewhat farther from top member 178. The function and purpose of baffle member 178 is explained hereinbelow.

The silt and sludge which enters housing 116 through opening 166, due to the action of suction pump 48 and the surge of inrushing water, impinges with some force on baffle 176 and in so doing its direction of movement is deflected and its rate of speed of movement considerably reduced. This enables any sand from the original lake bottom to separate from the relatively lighter silt material and fall back on the then relatively clean lake bottom. The speed and consequently the suction of pump 48 is varied by the operator to secure optimum cleaning conditions both by observing the rate or degree of suction by pump 48 as indicated by a suction gauge (not shown) and also by observing the condition of the material delivered by pump 48 to open tank 56.

Extending substantially across housing 116 and positioned beneath baffle 176 is an air flow-line or pipe 184 which is connected to the underside of member 178 of the baffle, see FIG. 12. Also positioned beneath top member 178 of baffle 176 and extending substantially the length thereof and connected thereto are two water flow-lines or pipes 186 and 188. Flow line 186 is connected to one end of a flexible hose 170 through which water from the main water discharge line 43 enters flow line 186. In like manner, flow line 188 is connected to one end of a flexible hose 174 through which water from the main water discharge line 43 flows into flow line 188. Flow lines 186 and 188 are not connected to each other nor do they directly communicate with each other. Additionally the center air flow line 184 does not directly communicate with either of the outer water flow lines 186 or 188. Flexible hoses 170 and 174 leading from flow lines 186 and 188 come together to join a single flexible hose 190 which connects with water discharge line 43 from pump 30 at the domed top portion 150 of housing 116. Flow lines 186 and 188 are thus supplied with pressurized water from the discharge side of the main pressure pump 30 through flexible hoses 43, 190, 170 and 174. Air flow line 184 is connected to one end of a flexible hose 168; the other end of which is connected to air discharge line 44 from compressor 40 at the domed top portion 150 of housing 116 to thus supply pressurized air to flow line 184 from the discharge side of air compressor 40 through flexible hoses 44 and 168.

Depending generally downwardly in a vertical direction from the underside of member 178 of the baffle 176 is a series of jetting pipe assemblies 192, 194, 196, 198, 200 and 202 which are used to further treat and additionally agitate the surface of the lake bottom for the purpose of further cleaning and additionally aerating the same to aid in the removal of algae and the like, particularly in beach and other like areas. Each of the jetting pipe arrangements 192 through 202 is similar to the one at 192, as more clearly depicted in FIG. 12, and includes an inner circular nozzle 204 and a larger outer circular nozzle 206 which concentrically surrounds inner nozzle 204. The inner nozzle 204 of each jetting pipe arrangement is attached to and communicates with air flow line 184 such that the pressurized air flowing therein may flow downward within nozzle 204, exiting the same in a downward jet of air 208. Outer nozzle 206 of each arrangement is attached to and communicates with side water flow lines 186 and 188, such that the pressurized water flowing in these flow lines 186 and 188 may move downward within nozzle 206 resulting in a downward jet of water 210, encompassing air jet 208 thereby further cleaning and aerating the lake bottom 18 and aiding in the removal of algae and the like. In the embodiment of the invention shown in the drawings, six jetting pipe assemblies have been depicted, but more or less could be used depending on the size of cleaning portion 16 of the apparatus employed. The only necessary requirement being that the number, spacing, size and flow through the nozzles be sufficient to thoroughly treat, agitate and aerate the surface of the lake bottom.

In using the apparatus of this invention it has been found that the best agitation and aeration of the lake bottom occurs when the pressure at which the air column or jet, within each of the jetting pipe assemblies 192 through 202, such as air jet 208 of assembly 192, operates is substantially less than the pressure at which its corresponding and surrounding water column or jet operates, such as water jet 210. Often times the jet of air within the hollow, surrounding water column or stream is operated at little or no pressure at all. In one experimental test the air jet was operated at a pressure of 10 p.s.i. and the water jet was operated at a pressure of 60 p.s.i. By operating the jet assemblies 192 through 202 with an air pressure substantially below the water pressure, the resulting streams of water are prevented from exploding and dispersing before they reach the lake bottom such that there is substantially no interference with their penetrating force. If the jet assemblies 192 through 202 are operated in this manner the lake bottom will be completely and thoroughly cleaned and aerated.

Under normal circumstances and operating conditions it is not usually necessary or required to operate or employ the jetting assemblies 192 through 202 to clean the deposited silt and sludge 124 from the lake bottom 18. The jetting assemblies 192 through 202 need only be employed under extreme circumstances when it is desired to thoroughly treat, agitate, aerate and clean the lake bottom, such as in beach areas. Normally the silt and sludge 124 deposited on the lake bottom 18 will be picked up, carried and moved upward by and within housing 116 due to the action of main suction pump 48, the forward movement (in the direction of arrow 126) of lower portion 16, and the surge of inrushing water through opening 166 and beneath gate 181.

Once the materials 124 which have been deposited on the lake bottom are picked-up, carried or moved into housing 116 under the urge of suction pump 48 and the action of the inrushing water through opening 166, the same will move upward under the baffle 176 and outward around the same as indicated by the flow lines 212 of FIG. 12. Side member 182 of baffle 176 is longer than side 180 and depends farther from top member 178 to insure that the upwardly moving silt laden fluid is deflected such that its direction of movement is changed and its velocity decreased. In moving outwardly around the depending sides 180 and 182 of baffle 176 the fluid or water laden with the materials of the lake bottom will change directions of movement from an essentially vertical component to a more substantially horizontal component, thereby causing a slight decrease in flow velocity whereby the heavier particles, such as the sand picked up from the original lake bottom, will separate from the main stream of flow and fall downward to eventually rest on the lake bottom; while the fluid containing the lighter particles, such as silt and sludge which had been deposited on the lake bottom will move upward around the side members 180 and 182 of the baffle 176 as indicated by flow lines 214. From this point the fluid or water laden with silt will be sucked upward as represented by flow line 216 and outward through openings 218 and 220 within the domed top portion 150 of housing 116 by the force of main suction pump 48, passing through flexible hoses 112 and 114, telescoping pipe 10 and flexible hose 52 before reaching the intake side of suction pump 48. Additional separation of the sand from the silt and sludge takes place in the area of less turbulence adjacently above the baffle 176, and in particular above and closely adjacent side members 180 and 182 thereof. The heavier sand materials separating from the silt and lighter materials fall downwardly upon the outside of side members 180 and 182, thence slide downwardly thereon and finally find their way back to the lake bottom; while the silt and lighter materials are carried upward by the water and other fluid to leave the housing 116 through openings 218 and 220.

From the main suction pump 48 the silt and sludge laden water moves into open tank 56 through hose 54, and from there into centrifuge 68 via pipe 66 where the solids and heavier materials are separated from the water. The sludge and heavier materials pass from the centrifuge through flow line 74 to the area of sludge deposition on the land areas, and the water passes from the centrifuge back into the lake through hose 69.

With particular reference to FIGS. 6 and 7 now, telescoping pipe 110 which connects the floating portion 10 with the cleaning portion 16 of the apparatus includes a larger outer section 222 which has its upper end 223 connected to the lower end of flexible hose 52; the other end of which is attached to the intake or suction side of main suction pump 48; and a smaller inner section 224 which fits within and telescopes within section 222. The lower end 226 of section 224 of telescoping pipe 110 is connected to the domed top portion 150 of housing 116 by a ball 228 and socket 230 arrangement whereby the cleaning portion 16 is permitted a limited universal movement with respect to telescoping pipe 110. The upper ends of flexible hoses 112 and 114 are also attached to lower section 224 of pipe 110 adjacent its lower end 226, while the lower ends of these hoses are connected to housing 116. The upper end 223 of section 222 is pivotally attached to barge 20 within opening 234 thereof by means of a pair of ball and socket connections 236 and 238.

The length of telescoping pipe 110 can be varied by means of a cylinder 240, piston 242 and piston rod 243 arrangement carried on the top thereof and mounted to section 222 at 244 and section 224 at 246. Hydraulic lines 248 and 250 are attached to opposite ends of hydraulic cylinder 240 and are employed to drive piston 242 and its attached piston rod 243 in either direction within the cylinder such as to lengthen or shorten telescoping pipe 110. Hydraulic lines 248 and 250 are joined together at a three-way control valve 252, which is connected to the end of flexible hose 254. The opposite end of hose 254 is connected at a Y-member 255 to hose 46 which is attached to the discharge side of main feed pump 30. Three way valve 252 is operable to direct pressurized water into hydraulic line 248, thereby lengthening telescoping pipe 110 or into hydraulic line 250 such that telescoping pipe 110 is shortened.

Figure 9:
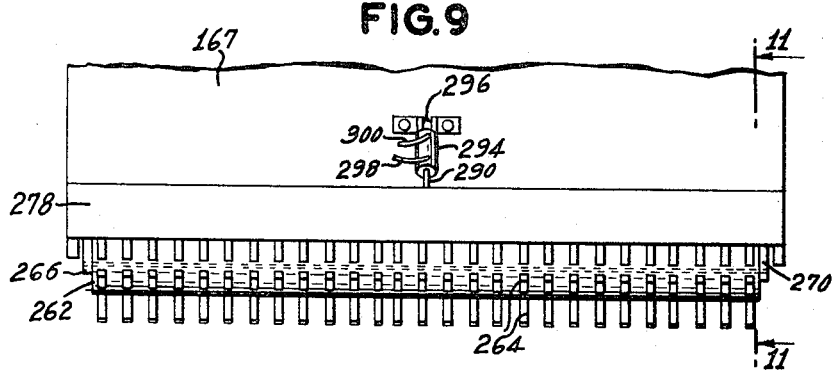
FIG. 9 is an enlarged partial left-hand end view of FIG. 2, showing a portion of the underwater apparatus of this invention.
Figure 10:
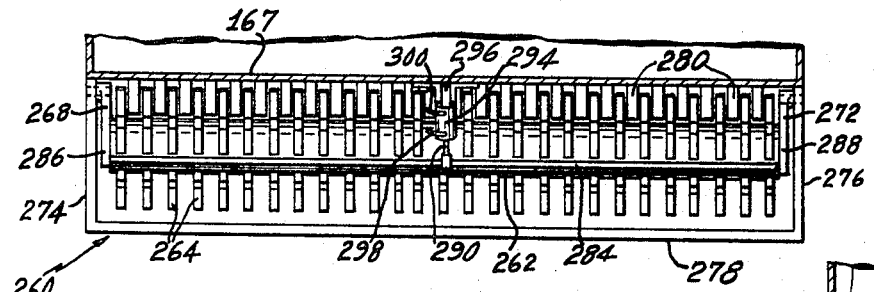
FIG. 10 is a top plan view of the apparatus shown in FIG. 9.
Figure 11:
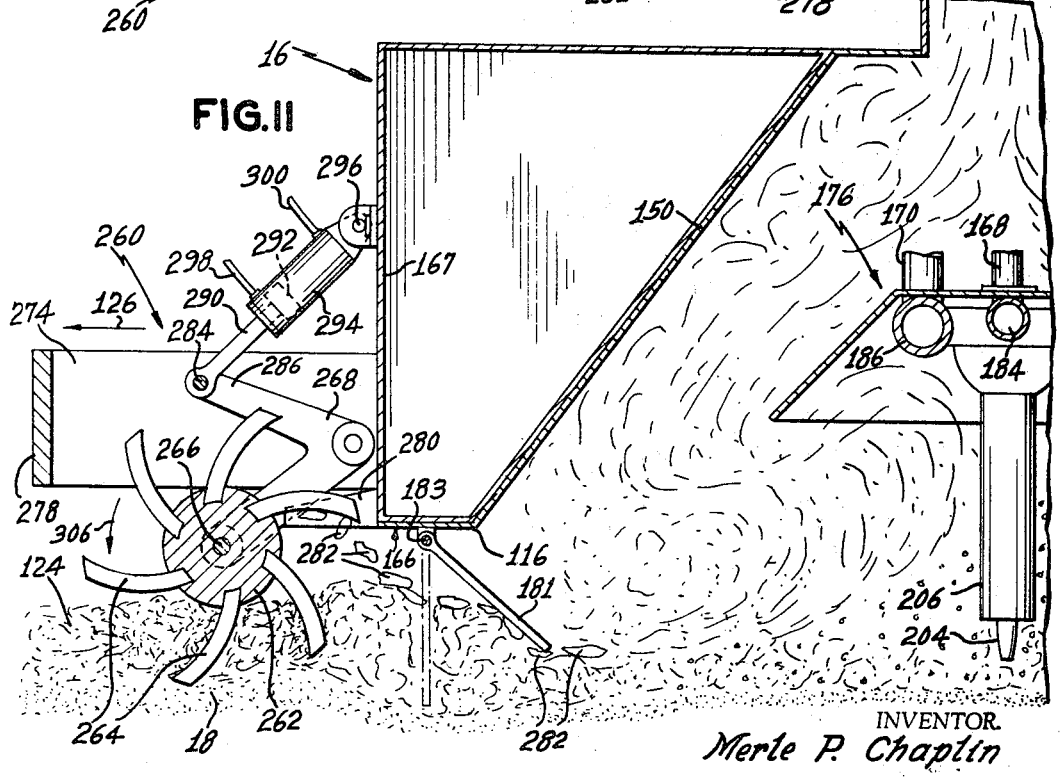
FIG. 11 is an enlarged transverse sectional view taken along line 11—11 of FIG. 9.

With particular reference to FIGS. 9, 10 and 11 now, the lake bottom cleaning apparatus of this invention further includes a mechanical raking or scraping device 260, which can be employed when desired to scrape, clean and free the lake bottom 18 of any growth of closely clinging weeds, grass and the like which at times may be present on the lake bottom. Scraping or raking device 260 is a part of lower portion 16 of the apparatus and is carried by and attached to housing 116, and in particular to structure 167 thereof.

Scraper 260 includes a wheel or drum 262 having rows of spaced teeth or tines 264 extending outwardly therefrom which are capable of raking or scraping and rooting-out any growth of closely clinging weeds which may be present on the lake bottom 18. Drum 262 is rotatably mounted at each of its ends to one end of a V-shaped member, such as at end 266 of V-shaped member 268 and at end 270 of V-shaped member 272. V-shaped members 268 and 272 are pivotally mounted at their apexes to respective side bar supporting members 274 and 276 closely adjacent the front wall of air chamber 167. A protective bar member 278 extends across the front of drum 262 and between side members 274 and 268 to protect and prevent the occurrence of damage to the rotating toothed drum 262 from any large pieces of wood, stone, junk or other like debris which may be on the lake bottom. A series of spaced rake-like members or tine cleaners 280 are provided attached to the front wall of air chamber 167 adjacent its lower edge and positioned such that the rotating teeth 264 of drum 262 pass therebetween whereby the pieces of weeds 282 clinging to and between the teeth 264 are cleaned or scraped therefrom and permitted to enter housing 116. A bar 284 extends between the other ends 286 and 288 of respective V-shaped members 268 and 272. Connected to the midportion of bar 284 is one end of a piston rod 290, the other end of which is connected to a piston 292 within a cylinder 294. The cylinder 294 is pivotally connected at 296 to the front wall of air chamber 167. Hydraulic hoses 298 and 300 are connected to cylinder 294 such that piston 292 can be driven upward or downward in the cylinder whereby rotating toothed drum 262 can be raised or lowered. In this manner drum 262 can be raised completely out of the way as to become inoperative or can be lowered to drive its teeth 264 more firmly into the lake bottom 18. Hydraulic hoses 298 and 300 are connected at their other ends to a three-way control valve 302 on barge 20 (see FIG. 1). Valve 302 is connected to one end of a flexible hose or flow line 304; the opposite end of which is connected at Y-member 255 to hose 46 which is attached to the discharge side of main feed pump 30.

When in operation the rotating toothed drum 262 of scraping device 260 is rotated in the direction of arrow 306, being driven by one of the electric motors 138 or 152, and the lower portion 16 is driven forwardly over the lake bottom 18 in the direction of arrow 126. The rate of forward movement of drum 262 is somewhat greater than its rate of rotation such that the teeth 264 tend to rake, scrape, dig and root-out the closely clinging weeds on their forward or front edge, before the teeth are rotated rearwardly such that the weed pieces 282 drop therefrom or are cleaned therefrom by tines 280. Weed pieces 282, upon leaving teeth 264, move into housing 116 through opening 165 beneath gate 181 to therein be further processed as hereinabove set forth.

While the method and apparatus of this invention have been described mainly in connection with lakes, and more particularly land-locked lakes and lakes having little or no outflow or drainage, the method and apparatus could be used and employed equally well in connection with rivers, streams, harbors, bays, beaches, inlets, sounds and other like bodies of water.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A method for substantially continuously cleaning a water covered basin which has been contaminated and polluted by deposited materials lying on the bottom of the basin comprising the steps of discharging a pressurized jet of fluid from above the bottom of the basin within a confined area downwardly to penetrate the contaminated and polluted basin to cause the materials to become laden within a water and fluid mixture moving upwardly from the bottom of the basin, moving the jet continuously along and over the basin, and discharging the laden mixture outwardly of the confined area.

2. The method as defined in claim 1 wherein the mixture is ladened with sand from the bottom of the basin, further comprising the step of generally separating within the confined area the sand from the remainder of the laden mixture before discharging the laden mixture.

3. The method as defined in claim 1 wherein the mixture is ladened with sand from the bottom of the basin, further comprising the step of decreasing the rate of flow of the upward movement of the laden mixture to permit the sand to become generally separated by settling on the bottom of the basin from the remainder of the laden mixture before discharging the laden mixture.

4. The method as defined in claim 1 wherein the mixture is ladened with sand from the bottom of the basin, further comprising the step of changing the direction of flow of the upwardly moving laden mixture to permit the sand to become generally separated by settling on the bottom of the basin from the remainder of the laden mixture before discharging the laden mixture.

5. The method as defined in claim 2 further comprising the step of substantially separating the water and fluid from the remainder of the laden mixture, and wherein the step of discharging the laden mixture includes discharging the separated water and fluid back into the basin and discharging the remainder of the laden mixture outwardly of the basin.

6. A method for substantially continuously reclaiming a water covered sand bottom basin which has been contaminated and polluted by deposited materials lying on the bottom of the basin comprising the steps of discharging a pressurized fluid jet means downwardly toward and from above the bottom of the basin to agitate and penetrate the contaminated and polluted bottom of the basin, producing a suction on the bottom of the contaminated and polluted basin by suction means within a confined area to laden the deposited materials and sand within water moving into the confined area and upward from the bottom of the basin, moving the fluid jet means and suction means within the confined area continuously along and over the basin, baffling within the confined area the laden water to generally separate the sand from the laden water by settling the sand on the bottom of the basin, and discharging the remainder of the laden water outwardly of the confined area.

7. The method as defined in claim 6 further comprising the step of dislodging existing plant growth from the bottom of the basin, the dislodged plant growth becoming thereafter laden within the water moving upwardly from the bottom of the basin together with the sand and the deposited materials.

8. Apparatus for cleaning a water covered sand bottom which has been polluted and contaminated by deposited materials comprising in combination a housing spaced above and closely adjacent the bottom, power means connected to said housing and drivingly engaging said sand bottom for moving said housing over the bottom, fluid jet means positoned within said housing directed generally downwardly toward and from above said sand bottom to force fluid into the deposited materials and sand to entrain the materials, sand, water and fluid into a laden mixture, suction means for sucking the laden mixture upwardly from the bottom, baffle means positioned within said housing above said jet means shaped and positioned to change the direction of and decrease the rate of flow of the laden mixture to provide circulation thereof within said housing wherein the upward flow is greater in one path than in another whereby the entrained sand becomes directed into a path of less upward flow thereby settling back to the bottom from the mixture, said suction means moving the remainder of the mixture from said housing to the surface of the water.

9. In the apparatus as defined in claim 8 wherein said fluid jet means includes a pair of concentric nozzle members, means to supply pressurized water to the outer said nozzle member, and means to supply pressurized air to the inner said nozzle member.

10. In apparatus for cleaning the soft bottom of a body of water, a barge, a submerged hood structure comprising a top and front, rear and side walls depending from said top, said walls having lower edges, the lower edges of the side walls being lower than the lower edges of said front and rear walls and being adapted to enter downwardly into and to provide at least a partial seal with the bottom material, a front door hinged to the lower edge of said front wall for swinging inwardly of said hood, a rear door hinged to the lower edge of said rear wall for swinging outwardly of said hood, means for moving said hood across said bottom comprising wheels in said hood and motor means for driving said wheels, a suction pump on said barge, a hose connecting from said pump into said hood, and means on said barge for separating at least part of the water from the water and solids mixture pumped by said pump through said hose from said hood.

11. The combination according to claim 10 further comprising a tined rotary rake for raking the bottom, said rake being carried by said hood and disposed for rotation on a horizontal axis forwardly of said front door, and a tine cleaner cooperative with the tines of said rake disposed adjacent said front door and oriented and positioned to remove collected trash, grass, weeds and the like objects from said tines in the path of suction flow into the hood through said front door, whereby such objects so removed enter said hood and are sucked by said pump to said barge.

12. The combination according to claim 10, further comprising fluid jet means positioned within said hood structure and directed generally downwardly to force fluid into the soft bottom of the body of water thereby entraining the solids, water and fluid into a laden mixture moving upwardly from the bottom.

13. The combination according to claim 11, further comprising fluid jet means positioned within said hood structure and directed generally downwardly to force fluid into the soft bottom of the body of water thereby entraining the solids, water and fluid into a laden mixture moving upwardly from the bottom.

14. The combination according to claim 10, wherein the drive wheels comprise sand gripping treads whereby the sludge stirred up by the wheels treads is sucked into said barge.

15. The combination according to claim 12, further comprising baffles in said hood structure to separate at least a part of the larger and higher specific gravity materials from the muddy water being sucked up before entering said hose.

References Cited

UNITED STATES PATENTS

| | | | |
|---|---|---|---|
| 729,718 | 6/1903 | Blaisdell | 210—271 |
| 1,393,492 | 10/1921 | Brooks | 210—241 X |
| 1,617,654 | 2/1927 | Sivade | 210—273 |
| 1,748,898 | 2/1930 | Peebles | 210—270 |
| 2,207,988 | 7/1940 | Laughlin | 210—270 |
| 2,315,254 | 3/1943 | Fraser | 210—270 |
| 3,071,249 | 1/1963 | Rains | 210—170 X |

FOREIGN PATENTS

| | | |
|---|---|---|
| 1,098,554 | 8/1955 | France. |

REUBEN FRIEDMAN, *Primary Examiner.*

J. ADEE, *Assistant Examiner.*